Sept. 15, 1953     H. G. MULLINS     2,651,927
KNIFE CRADLE
Filed Sept. 19, 1952
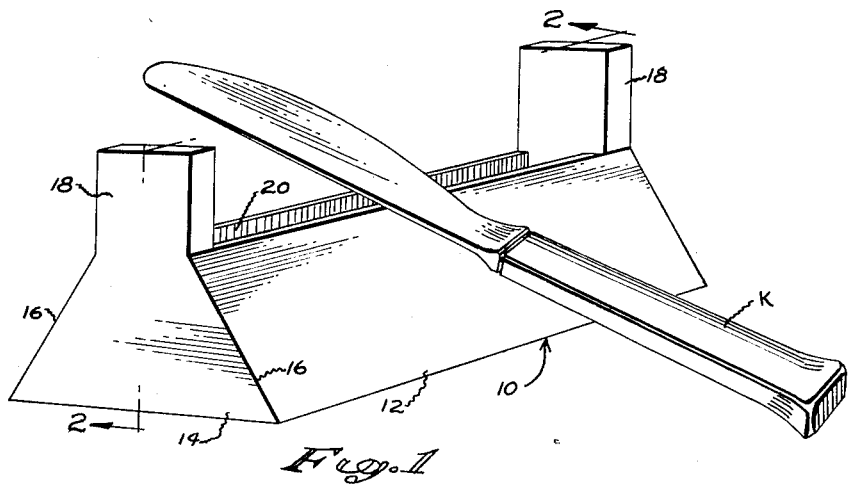
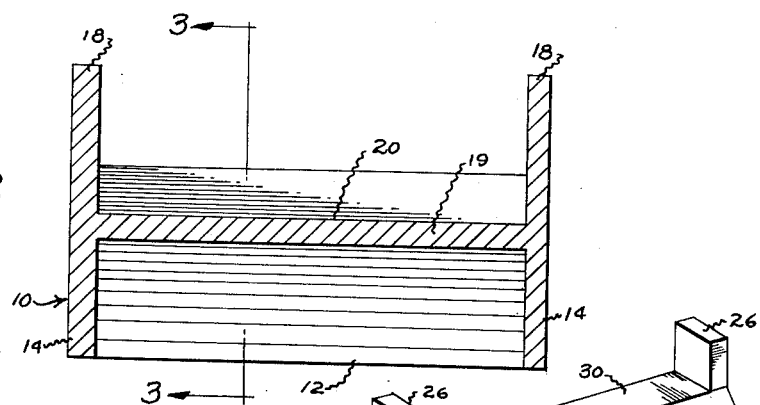
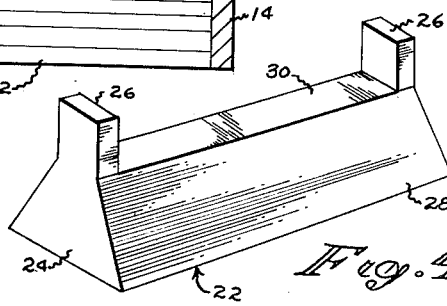
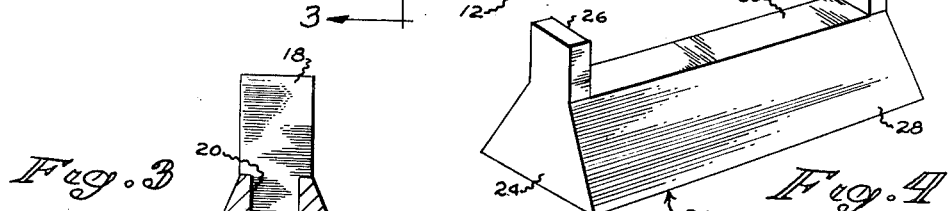
INVENTOR.
HERBERT G. MULLINS
BY
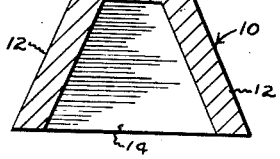
ATTORNEYS Patented Sept. 15, 1953

2,651,927

UNITED STATES PATENT OFFICE 2,651,927

KNIFE CRADLE

Herbert G. Mullins, Park Ridge, Ill.

Application September 19, 1952, Serial No. 310,529

1 Claim. (Cl. 65—65)

This invention relates to eating utensils or table accessories, and more particularly, has reference to a device adapted to receive a knife or other eating utensil, when the same is temporarily out of use.

Ordinarily, when a knife is not being used for cutting purposes, it is deposited upon the edge of a food plate, and it often happens that the knife will be accidentally jarred from its position, and will drop to the table cloth, causing the table cloth to be stained. In many instances, it is difficult to remove stains of this type by laundering, and as a result, the housewife is put to undesirable trouble and expense.

In view of the above, it is the main object of the present invention to provide a device adapted to be supported upon a table cloth, and adapted, further, to support the blade of a knife while the knife is temporarily out of use, thus to prevent the knife from being accidentally jarred from a plate onto a table cloth.

Another object of the present invention is to provide a knife cradle of the character stated which, in one form of the invention, can be provided with a receptacle adapted to receive drippings or scrapings from the knife blade. It is proposed, in this manner, to permit use of the invention as a device adapted particularly for association with a carving set, or with a cake knife, the device being adapted to permit food to be scraped from carving or cake knives into the receptacle mentioned.

Still another object of importance is to provide a knife cradle as stated which will be so formed as to prevent the knife supported thereon from being accidentally jarred off the cradle.

Still another object of importance is to provide a cradle of the character stated which can be readily formed from inexpensive materials, the device having no moving parts and being so designed as to permit its being fashioned from a single piece of molded plastic material or the like.

Other objects will appear from the following description, the claims appended thereto, and from the annexed drawing, in which like reference characters designate like parts throughout the several views, and wherein:

Figure 1 is a perspective view of a knife cradle formed in accordance with the present invention, as it appears when in use;

Figure 2 is a longitudinal sectional view taken on line 2—2 of Figure 1;

Figure 3 is a transverse sectional view taken on line 3—3 of Figure 2; and

Figure 4 is a perspective view of a modified form of the invention.

Referring to the drawings in detail, the knife cradle constituting the present invention has been designated generally by the reference numeral 10. As will be noted from the several figures of the drawing, the cradle is adapted to be molded or otherwise formed in a single piece, the finished product including a body portion 12 having elongated, upwardly converging side walls. Integral with opposite ends of the side walls are vertically disposed end walls 14, said end walls respectively having upwardly converging side edges registering with the end edges of the side walls of the body portion.

The upwardly converging side edges of the end walls have been designated by the reference numeral 16, and as will be noted from Figure 1, at their convergent ends, the side edges 16 are merged into the side edges of upstanding, rectangular guards 18. The guards 18 project a substantial distance above the convergent, spaced apart, upper edges of the side walls of the body portion.

Extending between the upper edges of the side walls of the body portion is an elongated, relatively narrow flat surface, said surface terminating at its opposite ends at the inner surfaces of the upstanding guards 18, and being formed with an elongated, longitudinal groove 20.

The groove 20 defines a receptacle closed at its opposite ends by the guards 18, and as will be noted from Figure 2, the bottom wall of the groove is defined by a web 19 extending between the side walls of the body portion, in spaced relation to the upper edges of said side walls.

When a knife K is supported upon the cradle, the blade of the knife will be positioned as shown in Figure 1, upon one wall of the groove 20. When the knife is so positioned, it will be held above a table cloth, so as to prevent the knife from staining the cloth with food. Additionally, it will be seen that the guards 18 prevent the knife from slipping off the opposite ends of the cradle.

It is also believed to be an important characteristic of the construction that the groove 20 permits drippings from the knife, such as melted butter, to pass into the receptacle provided therefor in the cradle. Or, if desired, food can be scraped from the knife blade upon the wall of the groove 20, the scraped food gravitating into the receptacle defined by said groove.

It is also considered to be an important characteristic of the construction that the body portion is relatively wide at its bottom, thus to afford a firm support for the device upon the table, in a manner whereby the device will be held against accidental tilting.

In Figure 4 I have illustrated a modified form, said form being substantially identical to the form shown in Figure 1, except for the provision of the groove 20. Thus, the modified cradle has been designated generally at 22, and includes a body portion having upwardly convergent, elongated side walls 28, said side walls being integral at their opposite ends with upwardly tapered, vertically disposed end walls 24. The end walls 24 are integral at their upper ends with upstanding guards 26 projecting above the upper edges of the side walls 28, and extending between the guards 26 is an elongated, relatively narrow, plane top surface 30 on which the knife blade is supported. The device shown in Figure 4 is particularly adapted to be used adjacent an individual plate setting, while the device shown in Figure 1 is advantageously used in association with carving or cake knives. Of course, the device shown in Figure 1 could be used at an individual plate setting if desired.

It is considered to be an important characteristic in the construction that the device has no moving parts, and can be readily molded or otherwise formed from a single piece of material. The device lends itself to its production from plastic material or the like, and thus the knife cradle can be manufactured at relatively low cost. At the same time, the cradle is capable of being attractively formed, to provide a desirable table accessory.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A knife cradle comprising; an elongated body portion having a relatively wide base, said body portion being of upwardly tapered cross sectional configuration to define at its upper end a relatively elongated, narrow supporting surface across which the blade of a knife may be supportedly positioned; and upstanding guards formed upon opposite ends of the body portion and extending upwardly from the respective ends of said supporting surface to provide means for preventing said knife from slipping off said surface, said supporting surface being formed with a longitudinal groove extending from end to end thereof, the opposite ends of said groove being closed by the guards to form said groove into a receptacle disposed for receiving food scraped from the knife blade.

HERBERT G. MULLINS.

References Cited in the file of this patent

UNITED STATES PATENTS

| Number | Name | Date |
|---|---|---|
| D. 26,319 | Wood | Nov. 24, 1896 |
| D. 165,885 | Taylor | Feb. 5, 1952 |
| 874,049 | Borsch | Dec. 17, 1907 |
| 889,434 | Bustanoby | June 2, 1908 |
| 1,264,914 | Fresh | May 7, 1918 |
| 1,386,469 | Gomoll | Aug. 2, 1921 |
| 2,554,951 | McGovern | May 29, 1951 |
| 2,567,817 | Lunde | Sept. 11, 1951 |

FOREIGN PATENTS

| Number | Country | Date |
|---|---|---|
| 9,527 | France | Sept. 14, 1908 |

(Addition to Pat. No. 388,836, Jan. 21, 1908)